United States Patent
Bolz et al.

(10) Patent No.: US 9,349,154 B2
(45) Date of Patent: *May 24, 2016

(54) BINDLESS TEXTURE AND IMAGE API

(75) Inventors: Jeffrey A. Bolz, Austin, TX (US);
Patrick R. Brown, Wake Forest, NC (US)

(73) Assignee: NVIDIA Corporation, Santa Clara, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/077,787

(22) Filed: Mar. 31, 2011

(65) Prior Publication Data

US 2011/0242117 A1    Oct. 6, 2011

Related U.S. Application Data

(60) Provisional application No. 61/321,090, filed on Apr. 5, 2010.

(51) Int. Cl.
*G06T 1/20* (2006.01)

(52) U.S. Cl.
CPC .................................... *G06T 1/20* (2013.01)

(58) Field of Classification Search
CPC ......... G06T 15/005; G06T 15/00; G06T 1/20; G06T 1/60; G06T 15/80; G06T 2210/52
USPC ......... 345/522, 426, 557, 501, 502, 506, 530, 345/544, 559
See application file for complete search history.

(56) References Cited

U.S. PATENT DOCUMENTS

| 6,295,068 | B1 * | 9/2001 | Peddada et al. | 345/419 |
| 8,176,233 | B1 * | 5/2012 | Karamcheti | 711/103 |
| 2008/0141131 | A1 * | 6/2008 | Cerny et al. | 715/716 |
| 2008/0246773 | A1 * | 10/2008 | Jiao et al. | 345/522 |
| 2008/0278509 | A1 | 11/2008 | Washizu et al. | |
| 2008/0303835 | A1 * | 12/2008 | Swift et al. | 345/522 |

OTHER PUBLICATIONS

Office Action, U.S. Appl. No. 13/078,848, dated Jan. 15, 2013.

* cited by examiner

*Primary Examiner* — Maurice L McDowell, Jr.
*Assistant Examiner* — Raffi Isanians
(74) *Attorney, Agent, or Firm* — Artegis Law Group, LLP

(57) ABSTRACT

One embodiment of the present invention sets for a method for accessing data objects stored in a memory that is accessible by a graphics processing unit (GPU). The method comprises the steps of creating a data object in the memory based on a command received from an application program, wherein the data object is organized non-linearly in the memory, transmitting a first handle associated with the data object to the application program such that data associated with different draw commands can be accessed by the GPU, wherein the first handle includes an address related to the location of the data object in the memory, receiving a first draw command as well as the first handle from the application program, and transmitting the first draw command and the first handle to the GPU for processing.

23 Claims, 5 Drawing Sheets

BINDLESS TEXTURE AND IMAGE API

CROSS-REFERENCE TO RELATED APPLICATIONS

This application claims benefit of United States provisional patent application entitled "Bindless Memory Access", filed on Apr. 5, 2010 and having Ser. No. 61/321,090.

BACKGROUND OF THE INVENTION

1. Field of the Invention

The present invention relates generally to accessing texture objects and image objects in GPU memory and, more specifically, to a bindless texture and image application programming interface (API) for OpenGL®.

2. Description of the Related Art

OpenGL® treats graphics concepts like textures, vertex buffers, shaders, constant buffers, and the like as opaque "objects" without exposing, to an application that references the objects, address details of the objects within a memory. Typically, the application binds such objects together and into a fixed set of hardware "units," e.g., texture units, vertex streams, constant buffer slots, or the like, through, e.g., API calls, without ever being aware of or having access to a physical address of the objects within the memory. Between the execution of graphics commands, e.g., Draw( ) commands, application programs frequently require access to different objects. In turn, the API is required to bind such new objects to the set of hardware units, which is costly. For example, significant processing overhead is introduced by requiring a driver to iterate a plurality of pointers per object to validate that the objects are properly located within the memory. As a result, a substantial bottleneck has developed in modern 3D graphics processing.

As the foregoing illustrates, what is needed in the art is a mechanism for accessing data objects without causing a graphics driver bottleneck.

SUMMARY OF THE INVENTION

One embodiment of the present invention sets forth a method for accessing data objects stored in a memory that is accessible by a graphics processing unit (GPU). The method comprises the steps of creating a data object in the memory based on a command received from an application program, wherein the data object is organized non-linearly in the memory, transmitting a first handle associated with the data object to the application program such that data associated with different draw commands can be accessed by the GPU, wherein the first handle includes an address related to the location of the data object in the memory, receiving a first draw command as well as the first handle from the application program, and transmitting the first draw command and the first handle to the GPU for processing.

One advantage of the disclosed method is that the GPU driver does not have to operate on the data objects each time they are used.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
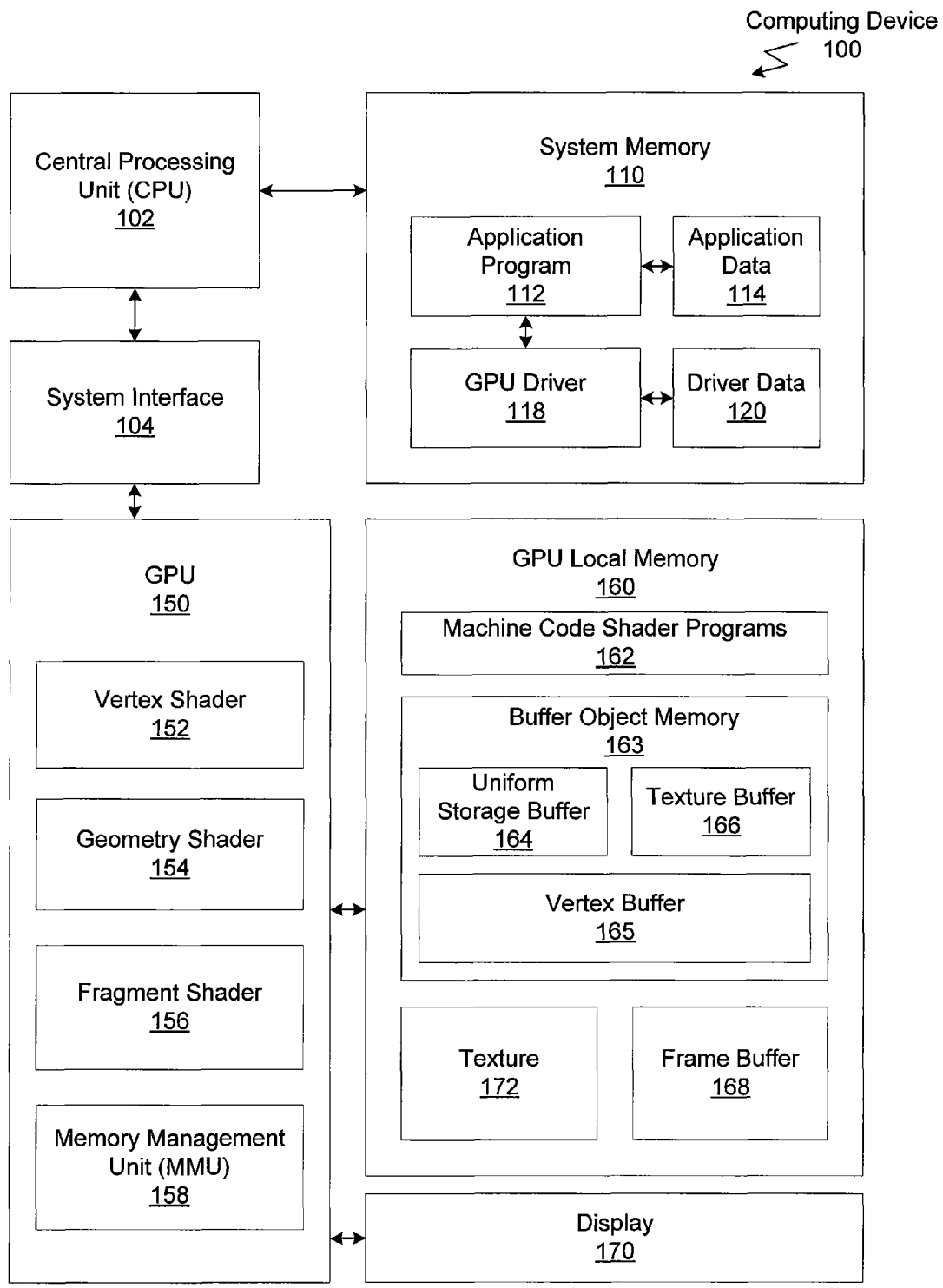
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163, texture 172 and frame buffer 168. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays. The vertex buffer 165 stores data elements describing the position and other attributes of vertices provided as inputs to the vertex shader 152.

The GPU local memory 160 includes texture 172 and frame buffer 168. The frame buffer 168 includes at least one two-dimensional surface that is used to drive the display 170. The frame buffer 168 may include more than one two-dimensional surface so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
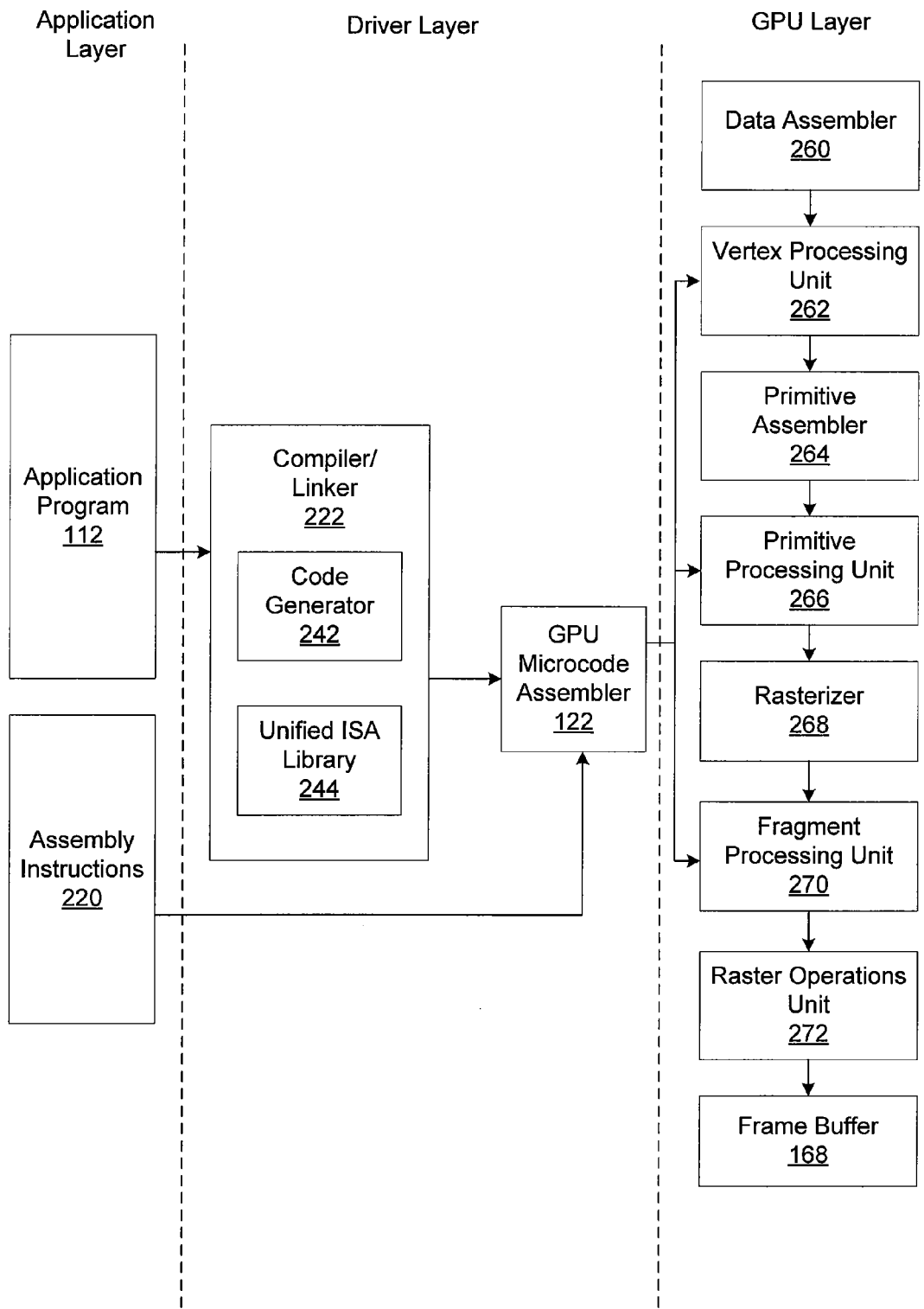
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. The primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan-converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
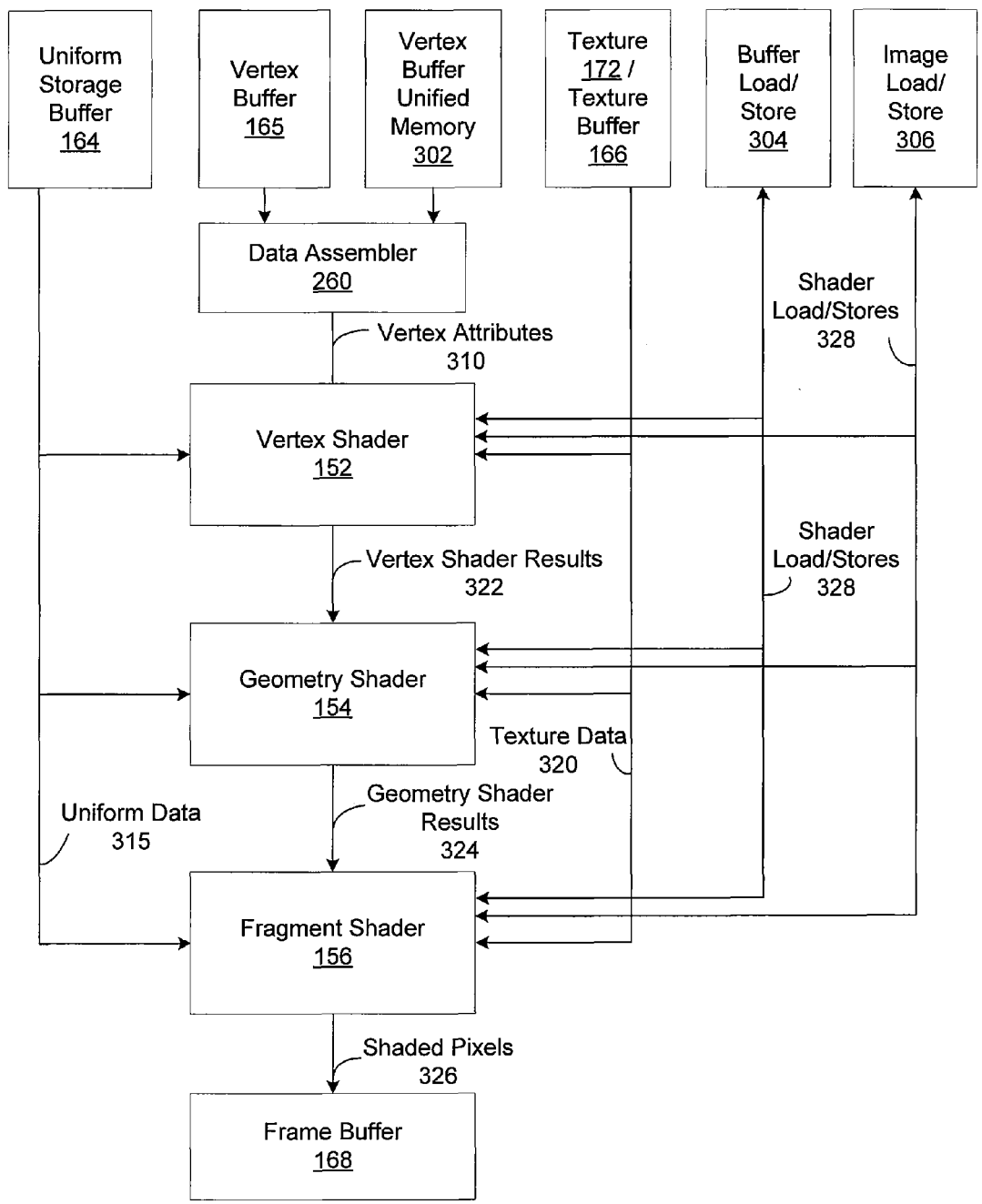
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164 and texture data 320 from the texture buffer 166 or texture 172. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164 and texture data 320 from the texture buffer 166 or texture 172. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164 and texture data 320 from the texture buffer 166 or texture 172. The output of the fragment shader 156 includes a stream of shaded pixels 326 that are written to the frame buffer 168.

In addition, each of the vertex shader 152, the geometry shader 154 and the fragment shader 156 may retrieve data from and write data to buffer objects (illustrated as shader load/stores 328) stored within the buffer object memory 163 via the buffer load/store mechanism 304. Similarly, each of the vertex shader 152, the geometry shader 154 and the fragment shader 156 may retrieve texture data and write texture data to image units stored within texture memory 172 via the image load/store mechanism 306.

BINDLESS TEXTURES AND IMAGES

The present invention provides a technique for directly referencing texture objects and image objects. By allowing the GPU 150 to refer to the objects directly rather than through, e.g., texture units—as required in previous approaches—the need for binding is eliminated. This avoids overhead on the CPU 102, since the GPU driver 118 does not have to repeatedly validate the objects being bound and does not have to manage its collection of binding points. As a result, the application program is able to rapidly switch between the objects by fetching different constants—hereinafter referred to as "handles." Additionally, this mechanism gives the application access to an effectively unlimited number of texture objects and image objects. Moreover, the present invention provides a technique wherein the objects can be made "resident," where such objects are "locked" within GPU local memory 160 and require only a single initialization operation to be made available to the application program for the duration of its execution.

Figure 4:
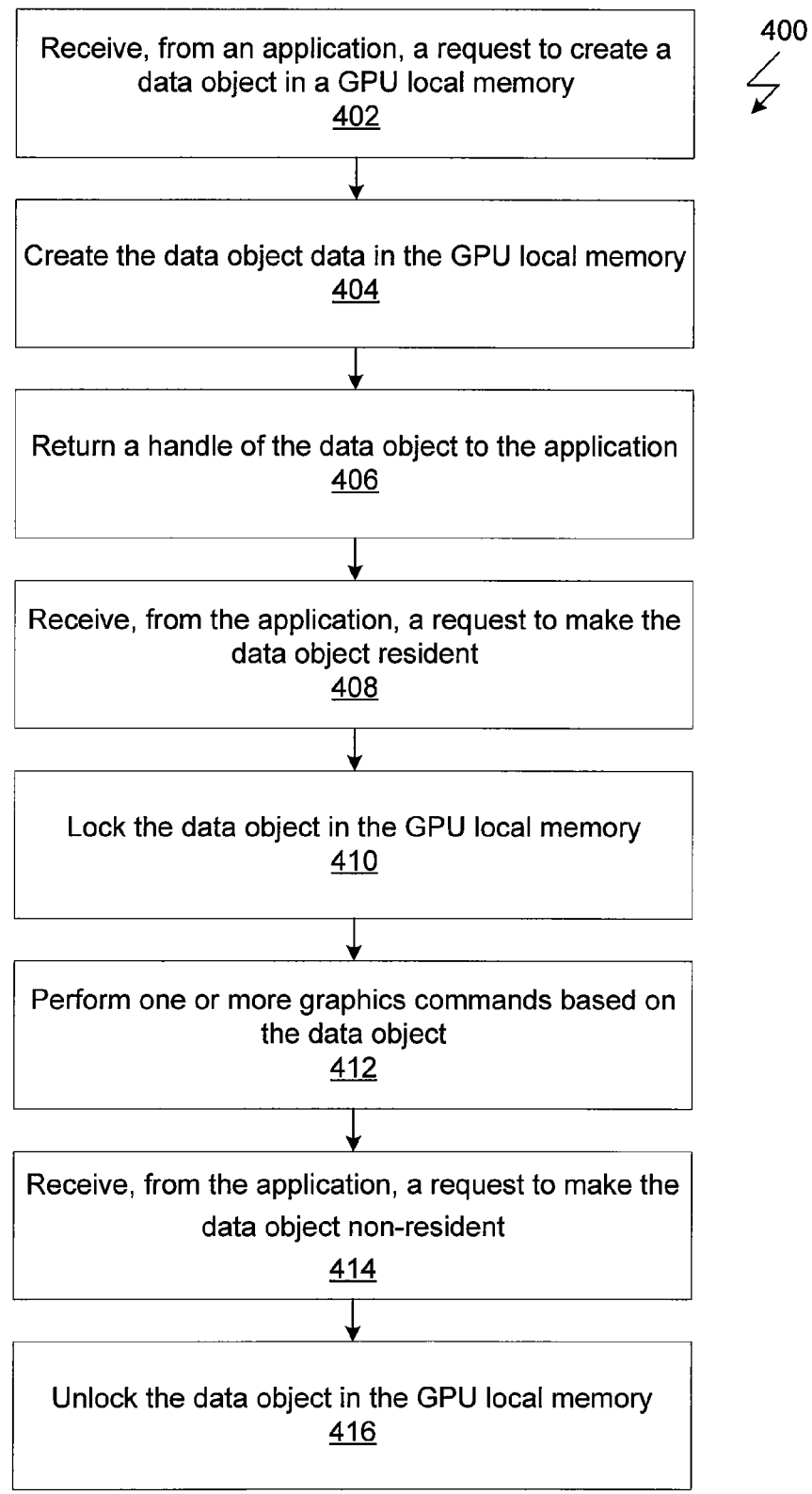
FIG. 4 is a flow diagram of method steps for creating a texture object or an image object and making the object resident in a memory, according to one embodiment of the present invention.

FIG. 4 is a flow diagram of method steps for creating a texture object or an image object and making the object resident in the GPU local memory 160, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the GPU driver 118 receives a request from the application program 112 to create a data object, e.g., a texture object, an image object, or the like, in the GPU local memory 160. At step 404, the GPU driver 118 creates the data object based on the request received from the application program 112. At step 406, based on a request received from the application program 112, the GPU driver 118 returns a handle associated with the data object created in the GPU local memory 160. At step 408, the GPU driver 118 receives a request from the application program 112 to make the data object resident such that it is guaranteed to be accessible to the GPU 150. In response, at step 410, the GPU driver 118 locks the data object in the buffer object memory 163 or texture buffer 172.

At step 412, a shader engine in the GPU 150, such as the vertex shader 152, performs one or more graphics commands on the resident data object, e.g., a graphics draw command that references a texture object. At step 414, the GPU driver 118 receives a request from the application program 112 to make the data object non-resident. In response, at step 416, the GPU driver 118 unlocks the data object in the GPU local memory 160. When the data object is made non-resident, the data object can no longer be accessed by a shader engine in the GPU 150.

In one embodiment, the GPU driver 118 locks data objects by first referencing the data objects to the context of the application program 112 and storing a list of all the data objects. A second list of all data objects that have been locked since a last command buffer submission, including those that were locked at the time of the last submission, is also maintained. When a user-mode driver fills out the command buffer with the commands received from the application program 112, the allocation list of the command buffer is populated with each data object in the first list of bound data objects and each data object in this second list of data objects stored in the GPU driver 118. In combination, these two lists identify the complete set of data objects required to be present in memory accessible to the GPU 150. If the set of data objects required by a plurality of command buffers exceeds the total amount of GPU local memory 160, memory management software in the GPU driver 118 can move the contents of data objects between GPU local memory 160 and system memory 110. Importantly, a handle associated with a data object is valid in all contexts to which the data object belongs. An alternate embodiment would only store a list of currently bound data objects, and their memory would always be accessible to the GPU 150.

In an alternate embodiment of the present invention, the handle associated with a data object is also a CPU address within a CPU address space. In another alternate embodiment, the handle is a 64-bit unsigned integer. In yet another alternate embodiment, the handle is a high-level language pointer that points to the corresponding data object in the GPU local memory 160.

Figure 5:
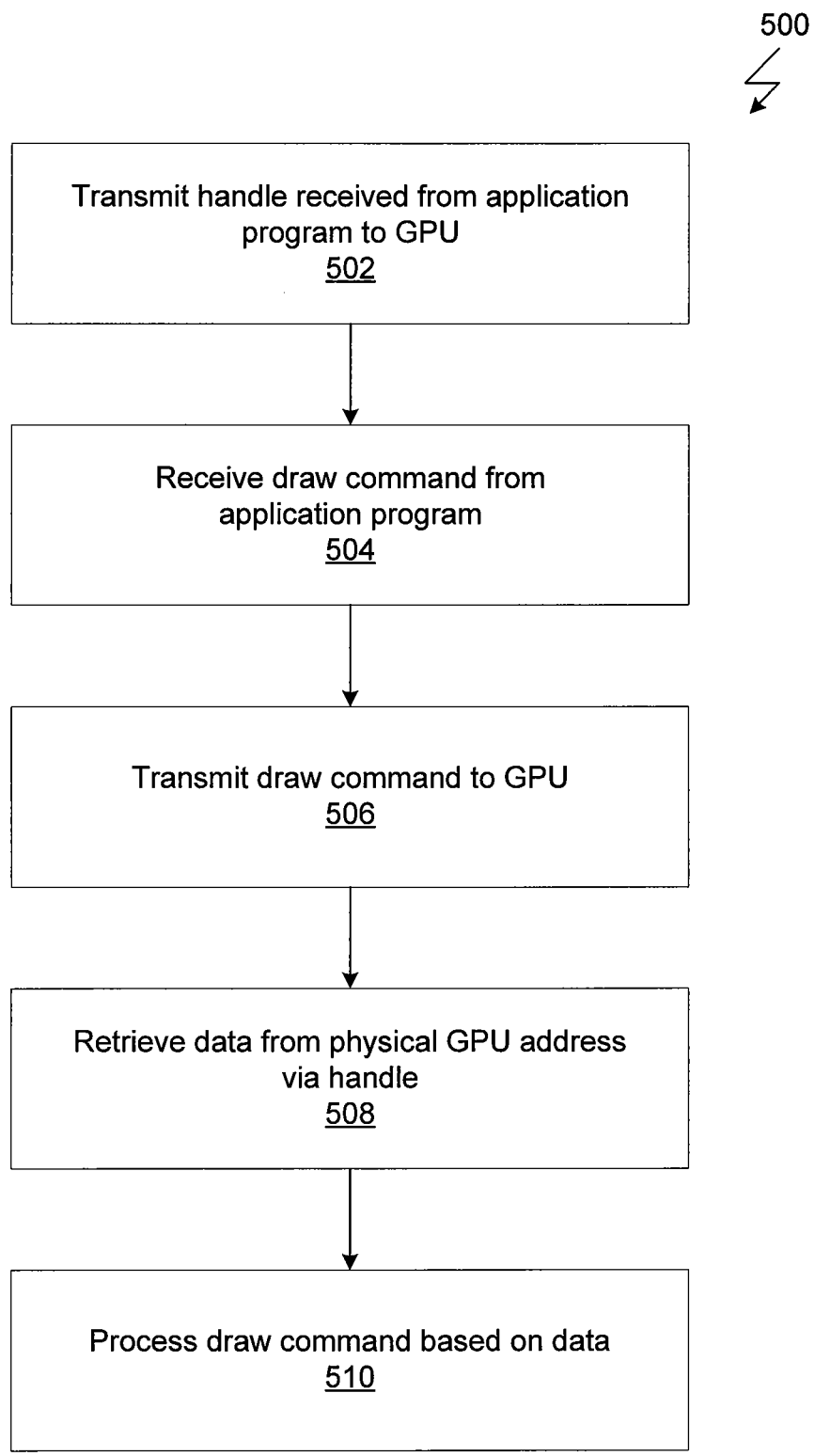
FIG. 5 is a flow diagram of method steps for loading data via a shader program using handles of a data objects, according to one embodiment of the present invention.

FIG. 5 is a flow diagram of method steps for loading data via a shader program using handles of data objects, according to one embodiment of the present invention. Although the method steps are described in conjunction with the systems for FIGS. 1-3, persons skilled in the art will understand that any system configured to perform the method steps, in any order, is within the scope of the invention.

The method 500 begins at step 502, where the GPU driver 118 transmits handles of data objects received from the application program 112 to the GPU 150. Importantly, the GPU driver 118 does not have to access the data objects within the driver data 120 to transmit the handles to the GPU 150. At step 504, the GPU driver 118 receives a draw command from the application 112 and, in response, at step 506, transmits the draw command to the GPU 150 for further processing.

At step 508, the GPU 150 retrieves the data object associated with the handle from the GPU local memory 160. Note that, in some cases, the handle may not refer to a data object but to a different handle, thereby providing an indirection technique that can be used to easily reference groups of data objects. At step 510, the GPU 150 processes the draw command received from the GPU driver 118 based on the data retrieved from the GPU local memory 160.

Extensions to the OpenGL® 3D graphics API and the OpenGL® Shading Language (GLSL) to support accessing texture and image objects via handles are discussed below. Persons skilled in the art will appreciate that the information in this section should be considered in conjunction with the current OpenGL® 4.0 specification. The extension presented herein is a GL_NV_bindless_texture extension.

As described above, the GL_NV_bindless_texture extension allows reading texture objects via handles, and, also, reading from, writing to, and performing atomic operations on image objects via handles.

To obtain a handle on a texture object, the commands "unit64 GetTextureHandleNV(uint texture)" and "unit64 GetTextureSamplerHandleNV(uint texture, unit sampler)" may be used. The command GetTextureHandleNV creates a texture object handle using the current state of the texture object named <texture>, including any embedded sampler state. The command GetTextureSamplerHandleNV creates a texture object handle using the current non-sampler state from the texture object named <texture> and the sampler state from the sampler object <sampler>. With both commands, a 64-bit unsigned integer handle is returned. The error INVALID_VALUE is generated if the <texture> parameter is not the name of an existing texture object or if the <sampler> parameter is not the name of an existing sampler object. The error INVALID_OPERATION is generated if the texture object <texture> is not "complete." If either error occurs, a handle of zero is returned.

To make a texture object handle accessible to shaders for texture mapping operations, a texture object handle must be made resident by calling the command "void MakeTextureHandleResidentNV(uint64 handle)." While the texture object identified by handle is resident, it may be used in texture mapping operations. If a shader attempts to perform a texture mapping operation using a handle that is not resident, the results of that operation are undefined and may lead to application termination. When a texture object handle is resident, the texture it references is also considered resident for the purposes of an "AreTexturesResident" command.

A texture object handle may be made inaccessible to shaders by calling the command "void MakeTextureHandleNonResidentNV(uint64 handle)." While it is not necessary for an application to call the command MakeTextureHandleNonResidentNV when a texture object handle will not be accessed for a period of time, doing so permits the memory manager in the GPU driver 118 to move the texture out of GPU local memory 160 thereby creating room for other data objects.

Turning now to image objects, texture object levels of detail may be made available to the application program via image object handles. Image object handles are 64-bit integers that identify a level of a texture object, as well as layer information for array and cube map texture objects, and an associated image format. The handle zero is reserved and will never be assigned to a valid image object handle. An image object handle is obtainable by calling the command "unit64 GetImageHandleNV(uint texture, int level, boolean layered, int layer, int format)."

The GetImageHandleNV command creates an image object handle from level <level> of the texture <texture>. If the <layered> parameter is FALSE, an image object handle is created for the entire texture object level. If the <layered> parameter is TRUE, an image object handle is created for only the layer <layer> of the texture object level. The <format> parameter specifies a format used to interpret the texels of the image object when used for image loads, stores, and atomic operations. A 64-bit unsigned integer handle is returned if the command succeeds, and zero is returned when an error occurs.

The error INVALID_VALUE is generated by the GetImageHandleNV command if the <texture> parameter is not the name of an existing texture object, if an image object for the texture level <level> does not exist (i.e., has a size of zero in <texture>), or if <layered> is TRUE and the <layer> parameter is greater than or equal to the number of layers in the image object at level <level>. The error INVALID_OPERATION is generated by the GetImageHandleNV command if the texture object <texture> is not complete, or if the <layered> parameter is TRUE and the texture object is not a three-dimensional, one-dimensional array, two dimensional array, cube map, or cube map array texture. As with GetTextureHandleNV, if any error occurs, a handle of zero is returned.

To make an image object handle accessible to shaders for texture mapping operations, a image object handle must be made resident by calling the command "void MakeImageHandleResidentNV(uint64 handle, enum access)." Here, the <access> parameter specifies whether the texture object bound to the image object handle will be treated as READ_ONLY, WRITE_ONLY, or READ_WRITE. If a shader reads from an image object handle made resident as WRITE_ONLY, or writes to an image object handle made resident as READ_ONLY, the results of that shader operation are undefined and may lead to application termination.

If an image object handle is resident, it may be used in image object load, store, and atomic operations. If a shader attempts to perform an operation on an image via an image object handle that is not resident, the results of that operation are undefined and may lead to application termination. When an image object handle is resident, the texture object it references is also considered resident for the purposes of the "AreTexturesResident" command.

An image object handle may be made inaccessible to shaders by calling the command "void MakeImageHandleNonResidentNV(uint64 handle)."

In addition to providing interfaces for extracting texture and image handles—along with making them resident and non-resident—the NV_bindless_texture extension additionally extends the OpenGL® Shading Language (GLSL) to facilitate access to bindless textures and images in shader programs. In prior-art implementations of GLSL, applications access textures in a shader by first binding them to an image unit in application code, reference them with a sampler variable declared in shader code, and then make an API call to set the value of the sampler variable to an integer specifying the number of the image unit where the texture is bound. The method for accessing image objects in GLSL shaders in prior-art implementations is performed in a similar manner. Unfortunately, these mechanisms involve CPU overhead both in the binding of the texture or image object and in updating the value of sampler or image variables.

The NV_bindless_texture extension provides a new mechanism that allows GLSL shaders to access sampler or image variables by assigning them the values of a texture or image handle using the command "void UniformHandleui64NV(int location, unit64 handle)". In this command, the variable to be updated is identified by the value <location>, and the texture or image handle to assign to the variable is identified by <handle>. Additionally, the NV_bindlesstexture extension continues to permit applications to update sampler or image variables using the prior-art method of binding a texture to a texture or image unit and then specifying the unit number with the command "void Uniform1i(int location, int value)". The value of sampler or image uniform values is interpreted according to the API used to specify the value. Alternatively, values loaded using UniformHandleui64NV will be interpreted as handles and values loaded using Uniform1i will be interpreted as unit numbers. This method advantageously allows concurrent use of bound textures and texture handles. Moreover, applications are permitted to use texture handles without making any modifications to existing shaders. For example, Uniform1i may be replaced with UniformHandleui64NV in application code. In one embodiment of the invention, the GPU driver 118 internally generate handles for textures bound to texture and image units and use handles in GPU microcode assembler 122 when accessing either bound textures or handles.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for accessing data objects stored in a memory that is accessible by a graphics processing unit (GPU), the method comprising:
   creating a data object in the memory based on a command received from an application program, wherein the data object is organized non-linearly in the memory;
   transmitting a first handle associated with the data object to the application program such that data associated with different draw commands can be accessed by the GPU, wherein the first handle includes an address related to the location of the data object in the memory;
   receiving a request from the application program to make the data object resident to allow the GPU to access the data object;
   storing the data object in a first list of data objects associated with a context of the application program and in a second list of data objects that have been locked since a last command buffer submission;
   receiving a first draw command as well as the first handle from the application program; and
   transmitting the first draw command, the first handle, and at least one of the first list of data objects and the second list of data objects to the GPU for processing;
   wherein the GPU is configured to retrieve a second data object from the memory based on a second handle that is referenced by the first handle.

2. The method of claim 1, wherein the GPU is configured to retrieve the data object from the memory based on the first handle and process the first draw command using data included in the data object.

3. The method of claim 1, wherein the data object comprises a texture or an image.

4. The method of claim 1, wherein the GPU is configured to use only the first handle to access the data object in the memory.

5. The method of claim 1, wherein the first handle is configured to retrieve a bound data object.

6. The method of claim 1, wherein a graphics shader engine that resides within the GPU is configured to retrieve the data object from the memory via an assembly code instruction that references the first handle or via a high-level shader language instruction that references the first handle.

7. The method of claim 1, wherein an additional command transmitted by the application program guarantees the GPU access to the data object in memory.

8. The method of claim 1, wherein an additional command transmitted by the application program indicates that no guarantee of GPU access to the data object is needed for a second draw command.

9. The method of claim 1, wherein the application program is configured to transmit one or more additional handles associated with one or more additional data objects with the first draw command such that the one or more data objects within the memory can be accessed via a single command.

10. A computer system, comprising:
   a central processing unit (CPU),
   a graphics processing unit (GPU), and
   a memory storing a graphics driver configured to:
      create a data object in the memory based on a command received from an application program, wherein the data object is organized non-linearly in the memory;
      transmit a first handle associated with the data object to the application program such that data associated with different draw commands can be accessed by the GPU, wherein the first handle includes an address related to the location of the data object in the memory;
      receive a request from the application program to make the data object resident to allow the GPU to access the data object;
      store the data object in a first list of data objects associated with a context of the application program and in a second list of data objects that have been locked since a last command buffer submission;
      receive a first draw command as well as the first handle from the application program; and
      transmit the first draw command, the first handle, and at least one of the first list of data objects and the second list of data objects to the GPU for processing;
      wherein the GPU is configured to retrieve a second data object from the memory based on a second handle that is referenced by the first handle.

11. A non-transitory computer-readable storage medium storing instructions that, when executed by a processor, enable the processor to access data objects stored in a memory that is accessible by a graphics processing unit (GPU), by performing the steps of:
   creating a data object in the memory based on a command received from an application program, wherein the data object is organized non-linearly in the memory;
   transmitting a first handle associated with the data object to the application program such that data associated with different draw commands can be accessed by the GPU, wherein the first handle includes an address related to the location of the data object in the memory;
   receiving a request from the application program to make the data object resident to allow the GPU to access the data object;
   storing the data object in a first list of data objects associated with a context of the application program and in a second list of data objects that have been locked since a last command buffer submission;
   receiving a first draw command as well as the first handle from the application program; and
   transmitting the first draw command, the first handle, and at least one of the first list of data objects and the second list of data objects to the GPU for processing;
   wherein the GPU is configured to retrieve a second data object from the memory based on a second handle that is referenced by the first handle.

12. The computer-readable storage medium of claim 11, wherein the GPU is configured to retrieve the data object from the memory based on the first handle and process the first draw command using data included in the data object.

13. The computer-readable storage medium of claim 11, wherein the data object comprises a texture or an image.

14. The computer-readable storage medium of claim 11, wherein the GPU is configured to use only the first handle to access the data object in the memory.

15. The computer-readable storage medium of claim 11, wherein the first handle is configured to retrieve a bound data object.

16. The computer-readable storage medium of claim 11, wherein a graphics shader engine that resides within the GPU is configured to retrieve the data object from the memory via an assembly code instruction that references the first handle or via a high-level shader language instruction that references the first handle.

17. The computer-readable storage medium of claim 11, wherein an additional command transmitted by the application program guarantees the GPU access to the data object in memory.

18. The computer-readable storage medium of claim 11, wherein an additional command transmitted by the application program indicates that no guarantee of GPU access to the data object is needed for a second draw command.

19. The computer-readable storage medium of claim 11, wherein the application program is configured to transmit one or more additional handles associated with one or more additional data objects with the first draw command such that the one or more data objects within the memory can be accessed via a single command.

20. The method of claim 1, wherein the first handle comprises a CPU address within a CPU address space.

21. The computer-readable storage medium of claim 11, further comprising, in response to receiving the request, locking the data object in the memory.

22. The computer-readable storage medium of claim 11, wherein a graphics shader engine that resides within the GPU is configured to access sample and image variables associated with the data object:
   as a bindless texture or image via a first shader language command that specifies the first handle, and
   as a bound texture or image via a second shader language command that specifies a unit number associated with the data object.

23. The computer-readable storage medium of claim 22, wherein at least one of the first handle and the unit number comprises a uniform variable that is held constant during a first invocation of the graphics shader engine but may be altered between the first invocation of the graphics shader engine and a second invocation of the graphics shader engine.

* * * * *